Patented July 24, 1928.

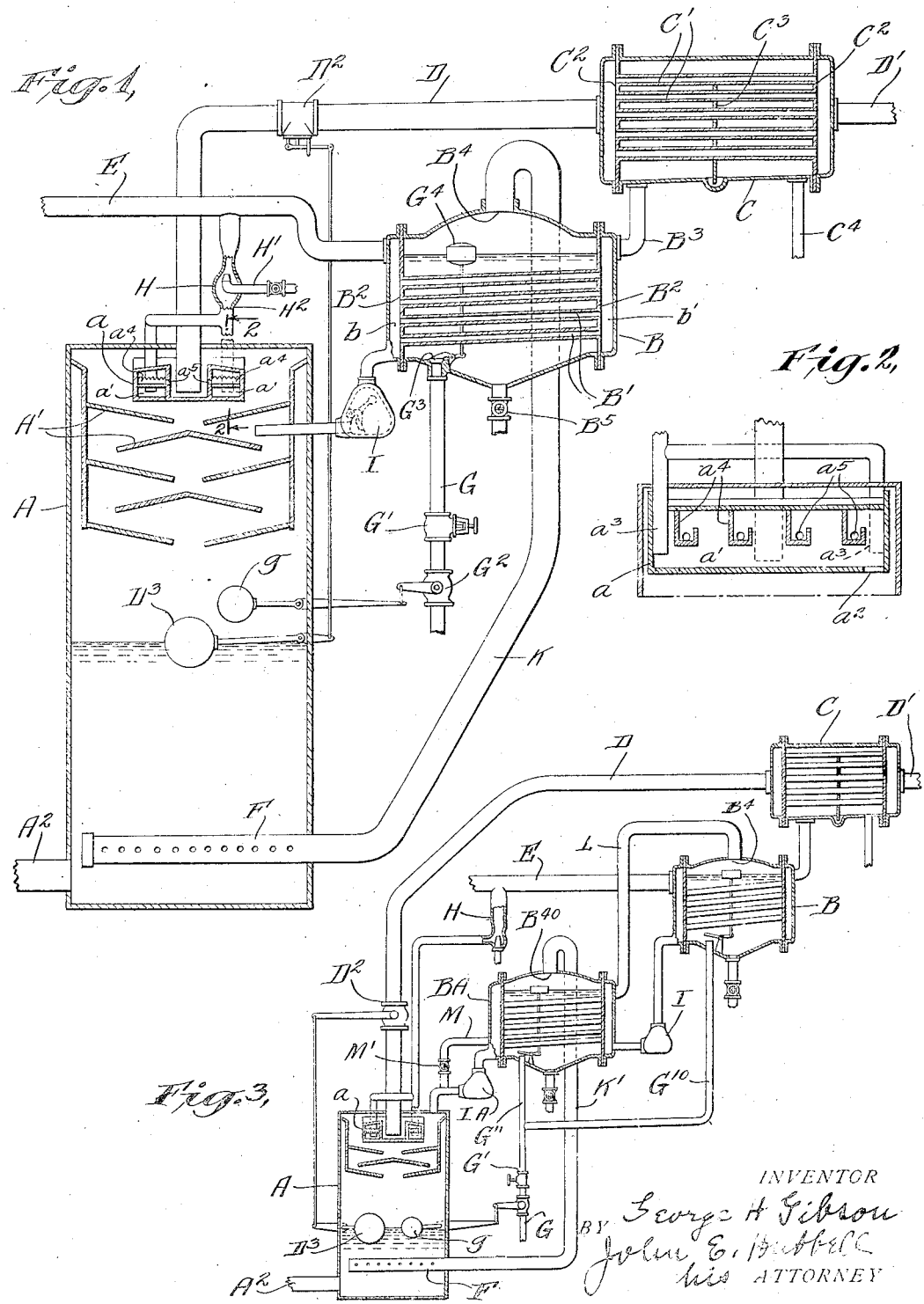

1,677,890

UNITED STATES PATENT OFFICE.

GEORGE H. GIBSON, OF MONTCLAIR, NEW JERSEY, ASSIGNOR TO COCHRANE CORPORATION, OF PHILADELPHIA, PENNSYLVANIA, A CORPORATION OF PENNSYLVANIA.

HEATING, DEAERATING, AND EVAPORATING WATER.

Application filed April 21, 1922. Serial No. 555,923.

My present invention consists in an improved method of, and apparatus for evaporating and heating water, devised with the special object in view of effectively utilizing exhaust steam, available at or above atmospheric pressure, in heating and deaerating boiler feed water to be supplied to an economizer at a temperature of say 140°, which is appreciably below the temperature of steam at atmospheric pressure, and in evaporating the raw make-up water which must be added to the condensate returning from the main condenser or condensers of the power plant.

The various features of novelty which characterize my invention are pointed out with particularity in the claims annexed to and forming a part of this specification. For a better understanding of the invention, however, and its advantages, and specific objects obtained by its use, reference should be had to the accompanying drawings and descriptive matter in which I have illustrated preferred forms of my invention.

Of the drawings:

Fig. 1 is a somewhat diagrammatic sectional elevation of one embodiment of my invention;

Fig. 2 is a section of a portion of the apparatus shown in Fig. 1, the section being taken on the line 2—2 of Fig. 1; and Fig. 3 is a view taken similarly to Fig. 1 showing a modified form of apparatus.

In the drawings, and referring first to the apparatus shown in Fig. 1, A represents a water deaerating heater comprising a closed chamber into the upper end of which the water to be heated and deaerated is passed through a supply pipe D. The lower portion of the heater A serves as a water storage and reboiling space, and the upper portion of the chamber serves as a vapor and water heating space.

The pipe D discharges into an overflow rectpacle $a$ located in the upper portion of the vapor space in the heater A. The overflow receptacle $a$ may be of any usual or suitable construction, but advantageously is of the special construction hereinafter described. The water passing into the receptacle $a$ is distributed by the latter on to a series of baffles or trays A' located in the vapor space of the heater A. Steam for heating and deaerating the water is supplied to the heater A through a reboiler F shown as a pipe located in the heater A well below the water level in the latter and formed with a multiplicity of small discharge orifices. The steam discharged through the pipe F into the body of water in the heater A passes upward through the water, and thence into the steam and vapor space of the heater where it is utilized in heating the water running down from the receptacle $a$ over the trays or baffles A'. In normal operation the water thus passing downward through the vapor space of the heater A is heated up approximately to the temperature of the body of water in the bottom of the heater before joining that body, so that little or none of the steam discharged from the pipe F into the body of water is condensed by the latter. The steam passing upward through the body of water agitates the water and carries out of it the air liberated by such agitation. The air liberated in the heater A is withdrawn from the latter by a suitable exhauster shown as a steam ejector H operated by live steam supplied through the pipe H'. The ejector H may have its suction inlet $H^2$ connected directly to the vapor space of the heater A adjacent the top of the latter, but advantageously, as shown, the connection is made through the hollow walls of the overflow receptacle $a$ when the latter is of the special construction shown and hereinafter described.

The steam supplied to the reboiler F is furnished by an evaporator B which, in the construction illustrated, comprises a series of tubes B' connected at their ends in tube sheets $B^2$, and enclosed in a casing providing chambers $b$ and $b'$ at its opposite ends which are connected by the tubes B'. The water to be evaporated is supplied to the intertube space of the evaporator by a raw material make-up supply pipe G. The intertube space of the evaporator is provided at its top with a steam outlet $B^4$ from which steam is supplied to the reboiler F through a conduit K. To avoid flooding the intertube space of the evaporator with water and thus destroying the necessary steam space in the latter, I advantageously provide a cut-off valve $G^3$, which is actuated by a float $G^4$ to close communication between the pipe G and evaporator B when the water in the intertube space of the evaporator reaches a predetermined maximum. By evaporating the make-up water the vapor of the latter passing to the heater A and condensed in the latter is freed from scale forming or other impurities which remain in the intertube space of the evaporator. From time to time the dirty water containing concentrated quantities of these impurities may be removed through the valved connection $B^5$ leading from the bottom of the intertube space of the evaporator B. The exhaust steam utilized in the apparatus is supplied to the chamber $b$ at one end of the evaporator B by a pipe E. The opposite end chamber $b'$ of the evaporator E is provided with an outlet $B^3$ at its upper end from which air and vapor admixed therewith may escape. The ejector H discharges into the pipe E, as shown, so that the air withdrawn from the heater A passes with the steam into the evaporator B, and escapes from the latter through the outlet $B^3$.

In the preferred construction illustrated, the vapor and air outlet $B^3$ from the evaporator B is connected to the intertube space of an air cooler and auxiliary condenser, or gleaner C, which comprises tubes $C'$ connected at their ends into tube sheets $C^2$ and enclosed in a casing providing chambers at its opposite ends which are connected by the tubes $C'$. The condensate from the main condenser or condensers of the power plant passes into one end chamber of the cooler C through a pipe $D'$, and passes out of the opposite end chamber through the pipe D leading to the chamber A. The intertube space of the cooler C is provided with a vent $C^4$ through which air and uncondensed vapor is discharged into the atmosphere. As shown the vent $C^4$ opens from the lower portion of the intertube space, and the latter is provided with a baffle $C^3$ which causes the vapor entering from the evaporator outlet $B^3$ to flow across the tubes $C'$ in two passes as indicated by the arrow.

Advantageously the casing C has its bottom wall inclined so that water of condensation formed in the intertube space will run back into the evaporator through the connection $B^3$. Preferably also, the tubes $B'$ are inclined slightly so that water of condensation formed in the latter will drain into the end chamber $b$ from which the water passes through a float trap I into the vapor space of the chamber A, preferably above some of the baffles $A'$ in the latter. As shown the supply of water to the chamber A through the pipe D is regulated by a valve $D^2$ which is operated by a float $D^3$ responsive to the height of water level in the heater A so as to maintain the water level approximately constant. As shown a float $g$ in the heater A is provided to close a valve $G^2$ in the raw water make-up supply pipe G in case the water level in the heater A rises to a predetermined height somewhat above the height of water level which the float $D^3$ tends to maintain. The pipe G is advantageously provided, also, with a manually regulable throttle valve $G'$.

The over-flow receptacle shown in Figs. 1 and 2 is of the special construction fully disclosed and claimed in my prior application, Serial No. 546,262, filed March 24, 1922. As thus constructed the overflow receptacle is of trough form and has a chamber $a'$ formed in each side wall. Each chamber $a'$ serves as an air cooler and is provided at one end with a port $a^2$ in its bottom wall and at its opposite end is provided with a vapor outlet port $a^3$. The ports $a^3$ of the two chambers $a'$ are connected to the suction inlet of the ejector H. In each chamber $a'$ are provided a plurality of overflow troughs $a^4$ receiving water from the overflow receptacle proper through ports $a^5$. The ports $a^5$ are so proportioned that they will pass only a comparatively small portion of the total amount of water supplied to the receptacle $a$ when the apparatus is operating at normal capacity.

The described construction insures a flow of air and vapor at relatively high velocity through the air cooling chambers $a'$. This, as well as the relatively large amount of cooling vapor and liquid contact surface provided in the chambers $a'$, and the fact that the path of air flow between the ports $a^2$ and $a^3$ is traversed by the broken streams of water overflowing from the different troughs $a^4$, contributes to make the air cooler highly efficient.

In the preferred contemplated mode of use of the apparatus shown in Figs. 1 and 2, exhaust steam at a temperature of 212° or a little above, is supplied by the pipe E to the tubes $B'$ of the evaporator B and furnishes the heat required for converting water in the intertube space of the evaporator into vapor at the temperature of 140° or so, corresponding to the temperature at which it is desired to withdraw water from the heater A through the outlet $A^2$. The heater A and evaporator B are operated under vacuums or minus pressures which correspond to the desired temperatures, and are maintained by the withdrawal of air from the heater A by the ejector H. The water vapor formed in the evaporator B passes through the outlet $B^4$ and conduit K to the reboiler F. Normally water is supplied through the pipe G to the evaporator B as rapidly as it is evaporated in the latter; and all of the steam supplied by the pipe E to the evaporator B is condensed in the latter with the exception of an insignificant amount which escapes from the evaporator into the air cooler C and carries with it the air which may enter the evaporator with the steam. It will be understood, of course, that by term "air" I mean to include not only atmospheric air, but also other non-condensable gases carried by the water and steam handled. The cooler C serves to cool the air and condense the vapor entering it from the evaporator outlet B³, so that most of the heat carried away from the evaporator by the air and vapor flowing through the outlet B³ is not wasted, but is absorbed by the water passing through the cooler C to the chamber A.

In consequence of the mode of operation described, all but a negligible fraction of the heat contained in the exhaust steam supplied to the apparatus through the pipe E as well as the available heat in the discharge from the ejector H is utilized in evaporating the make-up water, and in heating the water supplied to the chamber A by the pipe D. The deaerating heater A serves as a condenser for the evaporator B and the latter serves as a source of supply of steam at the proper low temperature for the deaerating heater and also serves as a condenser for the steam supplied to the ejector H.

The apparatus shown in Fig. 3 differs from that shown in Fig. 2 by the addition of a second evaporator BA. The evaporators B and BA employed in Fig. 3 may each be similar in construction to the evaporator B of Fig. 1. The evaporator B of Fig. 3 receives steam from the exhaust steam pipe E, but the steam passing from the intertube space of the evaporator does not go directly to the heater A, but passes through a pipe L into an end chamber of the evaporator BA. The water of condensation draining out of the evaporator B of Fig. 3 is passed by the trap I into an end chamber of the evaporator BA. The vapor outlet B⁴⁰ of the evaporator BA is connected by a pipe K' to the reboiler F of the deaerating heater A. Water of condensation formed in the evaporator BA is passed to the heater by a trap IA. Air and condensed vapor escape from the evaporator BA to the heater A through a vent pipe M, which is advantageously provided with a throttle valve M'. Water is supplied to the intertube spaces of the two evaporators B and BA of Fig. 3, by branches G¹⁰ and G¹¹ of the raw water make-up supply pipe G. Those skilled in the art will understand without further explanation that in operation, the pressure and temperature in the intertube space of the evaporator B are intermediate of the temperatures and pressures of the steam supplied by the pipe E and prevailing in the heater A. The two evaporators B and BA of Fig. 3 give a multiple effect, and will evaporate approximately twice as much water for a given consumption of steam as can be evaporated with the single evaporator of Fig. 1.

While in accordance with the provisions of the statutes I have illustrated and described the best form of my invention now known to me, it will be apparent to those skilled in the art that changes may be made in the form of my invention without departing from its spirit as set forth in the appended claims, and that certain features of my invention may sometimes be used to advantage without a corresponding use of other features.

Having now described my invention, what I claim as new and desire to secure by Letters Patent, is:

1. The method which consists in evaporating water from one source, passing the water vapor thereby formed and water from another source into a heater of the steam and water contact type to thereby condense the vapor and heat the last mentioned water, withdrawing air from said heater by means of a steam jet ejector, and utilizing the available heat of the discharge from said ejector in the evaporation of the water from said one source.

2. The method of preparing boiler feed water from condenser condensate and raw make-up water with steam available at high and low pressures which consists in vaporizing the make-up water in an evaporator, condensing the vapor generated in the evaporator by contact with the condensate in a water heater of the steam and water contact type, withdrawing air from the heater by a steam ejector supplied with steam at high pressure, and heating the evaporator with the exhaust from the ejector and the low pressure steam.

3. The method of preparing boiler feed water from condenser condensate, raw make-up water and steam available at high and low pressures which consists in vaporizing the make-up water in an evaporator, condensing the vapor generated in the evaporator by contact with the condenser condensate in a water heater of the steam and water contact type, withdrawing air from the heater by a steam ejector supplied with steam at the high temperature, passing the exhaust from the ejector and the low pressure steam into the evaporator, and passing the water of condensation formed from the steam supplied to the evaporator into the heater.

4. The combination with a water heater of the steam and water contact type, of means for passing water to be heated into said heater, an evaporator comprising a heating chamber and an evaporating chamber, means for passing steam generated in said evaporating chamber into the water heater, and a steam ejector withdrawing air from the heater and exhausting into the evaporator heating chamber.

5. The combination with a water heater of the steam and water contact type, of means for passing water to be heated into said heater, an evaporator comprising a heating chamber and an evaporating chamber, means for passing steam generated in said evaporating chamber into the water heater, and a steam ejector withdrawing air from the heater and exhausting into the evaporator heating chamber, and means for supplying additional steam to said heating chamber.

6. The combination with a water heater of the steam and water contact type, of an air cooler having an air outlet to the atmosphere, means for passing water to be heated through said cooler into said heater, an evaporator comprising a heating chamber with an air outlet connected to said cooler, and an evaporating chamber, means for passing steam generated in the evaporating chamber into the water heater, a steam ejector withdrawing air from the heater, and means for passing the exhaust from the ejector into the evaporator heating chamber.

7. The combination with a water heater of the steam and water contact type, of an air cooler having an air outlet to the atmosphere, means for passing water to be heated into said heater, an evaporator comprising a heating chamber with an air outlet connected to said cooler, and an evaporating chamber, means for passing steam generated in the evaporating chamber into the water heater, a steam ejector withdrawing air from the heater, means for passing the exhaust from the ejector into the evaporator heating chamber, means for supplying additional steam to said heating chamber, and provisions for passing water of condensation formed in said heating chamber into the heater.

8. In a steam power plant, comprising a main condensate return line, a make-up water supply, and a source of exhaust steam at a temperature above that in which it is desirable to heat the boiler feed water preparatory to passing the latter into an economizer, the improvement which consists of an evaporator comprising a water evaporating chamber into which the make-up water is passed, and a heating chamber into which the exhaust steam is passed, and which is provided with an air outlet, a water heater of the water and steam contact type, an air cooler having an air outlet, and an air inlet to which the air outlet from said heating chamber is connected, provisions for passing said condensate through the cooler into said heater, means for passing the vapor formed in said evaporating chamber and the liquid of condensation formed in said heating chamber into said heater, a steam ejector withdrawing air from the heater, and provisions for passing the discharge from the ejector into said heating chamber.

9. In a steam power plant, comprising a main condensate return, a make-up water supply, and a source of exhaust steam at a temperature above that to which it is desirable to heat the boiler feed water preparatory to passing the latter into an economizer, the improvement which consists of an evaporator comprising a water evaporating chamber into which the make-up water is passed, and a heating chamber into which the exhaust steam is passed, a water heater of the water and steam contact type, an air cooler having an air outlet, provisions for passing the condensate from said return through the cooler into said heater, means for passing vapor from said evaporating chamber and liquid of condensation from said heating chamber into said heater, a steam ejector withdrawing air from the heater and discharging it into said heating chamber, and provisions for passing air from said heating chamber into said cooler and for returning liquid of condensation from the cooler to the heating chamber.

10. Apparatus for heating and deaerating water supplied from a source of condensate and additional make up water, comprising in combination a deaerating water heater of the steam and water contact type provided with a water inlet from said source, a submerged perforated steam inlet pipe, a water outlet, and an evaporator comprising a closed evaporating chamber having a steam outlet connected to said pipe, means for supplying make up water to said chamber, and means external to said chamber for heating the latter.

11. Apparatus for heating and deaerating water supplied from a source of condensate and additional make up water, comprising in combination a deaerating water heater of the steam and water contact type provided with a water inlet from said source, a submerged perforated steam inlet pipe, a water outlet, and an air outlet, an evaporator comprising a closed evaporating chamber having a steam outlet connected to said pipe, means for supplying make up water to said chamber, and means external to said chamber for heating the latter and air exhausting means connected to said air outlet.

12. In a steam power plant comprising a main condensate return, a make-up water supply, and a source of exhaust steam at a temperature above that to which it is desirable to heat the boiler feed water preparatory to passing the latter into an economizer, the improvement which consists of an evaporator comprising a water evaporating chamber into which the make-up water is passed, and a heating chamber into which the exhaust steam is passed, a water heater and deaerator of the reboiler type having a submerged perforated steam inlet pipe, provisions for passing the condensate from said return into said heater, and means for passing vapor from said evaporating chamber into said inlet pipe.

13. In a steam power plant, comprising a main condensate return, a make-up water supply, and a source of exhaust steam at a temperature above that to which it is desirable to heat the boiler feed water preparatory to passing the latter into an economizer, the improvement which consists of an evaporator comprising a water evaporating chamber into which the make-up water is passed, and a heating chamber into which the exhaust steam is passed, a water heater and deaerator of the reboiler type having a submerged perforated steam inlet pipe, provisions for passing the condensate from said return into said heater, means for passing vapor from said evaporating chamber into said inlet pipe, and a steam ejector withdrawing air from said heater.

14. Apparatus for heating and deaerating water comprising in combination, a deaerating water heater of the steam and water contact type provided with a water inlet, a deaerated water outlet and a steam inlet, and an evaporator having an evaporating chamber and a heating chamber, means for supplying steam to, and means for discharging water of condensation from said heating chamber, means for supplying water to said evaporating chamber, and means for passing steam generated in said evaporating chamber to said steam inlet.

Signed at Philadelphia, in the county of Philadelphia and State of Pennsylvania this 17th day of April A. D. 1922.

GEORGE H. GIBSON.